(12) United States Patent
Lim et al.

(10) Patent No.: US 7,492,719 B2
(45) Date of Patent: Feb. 17, 2009

(54) METHOD OF CONTROLLING LOOP-BACK PROCESS IN ETHERNET PASSIVE OPTICAL NETWORK

(75) Inventors: Se-Youn Lim, Seoul (KR); Jae-Yeon Song, Songnam-shi (KR); A-Jung Kim, Seoul (KR); Jin-Hee Kim, Suwon-shi (KR); Su-hyung Kim, Seoul (KR); Min-Hyo Lee, Suwon-shi (KR); Ho-Il Oh, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 940 days.

(21) Appl. No.: 10/650,580

(22) Filed: Aug. 28, 2003

(65) Prior Publication Data

US 2004/0136713 A1    Jul. 15, 2004

(30) Foreign Application Priority Data

Jan. 2, 2003    (KR) ............... 10-2003-0000145

(51) Int. Cl.
*H04L 1/00* (2006.01)
*H04J 1/16* (2006.01)
(52) U.S. Cl. .............. 370/241.1; 370/248; 370/249
(58) Field of Classification Search .......... 370/248, 370/249, 236.2, 224, 242, 351, 409
See application file for complete search history.

(56) References Cited

U.S. PATENT DOCUMENTS 5,878,032 A * 3/1999 Mirek et al. ............. 370/252
6,404,740 B1 * 6/2002 Yoshida ................... 370/241.1
6,636,484 B1 * 10/2003 Agrawal et al. ............ 370/248
6,850,520 B1 * 2/2005 Takada et al. ............. 370/389
6,873,599 B1 * 3/2005 Han ........................ 370/249
2004/0052263 A1 * 3/2004 Xu ........................... 370/399

FOREIGN PATENT DOCUMENTS

| JP | 03-88455 | 4/1991 |
| JP | 08-242242 | 9/1996 |
| JP | 2001-053754 | 2/2001 |

OTHER PUBLICATIONS

IEEE 802.3ah Etheret in the First Mile Task Force; "OAM in Frames" Oct. 2001; Presentation Materials, 6 pgs.

* cited by examiner

*Primary Examiner*—Wing F Chan
*Assistant Examiner*—Hicham B Foud
(74) *Attorney, Agent, or Firm*—Cha & Reiter, LLC

(57) ABSTRACT

A method of controlling a loop-back process between a local device and a remote device in an Ethernet passive optical network simplifies the initiation and the termination processes for a loop-back process by avoiding the use of Operation, Administration and Maintenance—Packet Data Unit (OAM PDU) information along with a loop-back control OAM PDU. The method includes the steps of: (a) adding a predetermined field into a loop-back control OAM PDU in the loop-back process, the predetermined field having distinguishing messages for initiation of a loop-back process and messages for termination of a loop-back process; and (b) the local device and the remote device performing a loop-back process using the loop-back control OAM PDU.

3 Claims, 5 Drawing Sheets

| Type | Description |
|---|---|
| 0x01 | Initiate_Req |
| 0x02 | Initiate_Ack |
| 0x03 | Exit_req1 |
| 0x04 | Exit_req2 |
| 0x05 | Exit_Ack |

FIG.4

METHOD OF CONTROLLING LOOP-BACK PROCESS IN ETHERNET PASSIVE OPTICAL NETWORK

CLAIM OF PRIORITY

This application claims priority to an application entitled "Method of controlling loop-back process in Ethernet passive optical network," filed in the Korean Intellectual Property Office on Jan. 2, 2003 and assigned Serial No. 2003-145, the contents of which are hereby incorporated by reference.

BACKGROUND OF THE INVENTION

1. Field of the Invention

The present invention relates to operation, administration, and maintenance (hereinafter, referred to as "OAM") functions in Ethernet passive optical network.

2. Description of the Related Art

Currently, the standardization of the Media Access control (MAC) technologies for a Gigabit Ethernet and an Asynchronous Transfer Mode Passive Optical Network (hereinafter, referred to as "ATM-PON") have been completed, the details of which are described in the IEEE 802.3z and in the International Telecommunication Union-Telecommunication standardization sector (ITU-T) G983.1.

In an ATM-PON having a tree-shaped structure, ATM cells are transmitted upward and downward in the units of frames having a predetermined size. An optical line termination (OLT) is provided to transmit downward cells, which will be distributed to each optical network unit (ONU).

FIG. 1 illustrates a physical network architecture of a general passive optical network. As shown, a passive optical network includes an OLT 100 and a plurality of ONU 110-1 to 110-3 connected to the OLT 100. In particular, FIG. 1 shows an example in which an OLT 100 and three ONUs 110-1 to 110-3 are connected with each other, and each of the ONUs 110-1 to 110-3 is connected to at least an end user (a user device or a network device) 120-1 to 120-3. In operation, data 131 to 133 outputted from each end user 120-1 to 120-3 are transmitted to the OLT 100 through a corresponding ONU 110-1 to 110-3.

In the optical network (hereinafter, referred to as "EPON") shown in FIG. 1, an IEEE 802.3 Ethernet frame is transmitted through a point-to-multipoint network according to a time division multiplexing (TDM) method. To avoid data collision, a method called 'ranging' is implemented in an optical distribution network (ODN), which is a passive device. That is, during an upward transmission, the data from each of the ONUs 110-1 to 110-3 is transmitted to the OLT 100 in a multiplexed state, and downward transmission is performed in such a manner that the ONUs 110-1 to 110-3 selectively receives the intended data from the OLT 100. To this end, each of upward and downward frames has a dedicated ATM cell or a field allocated in a normal ATM cell so as to transmit and receive messages at regular intervals.

With the development of Internet technology, the demand for more bandwidth is growing steadily. To address the need, the development for end-to-end transmission in the Gigabit Ethernet, which is relatively low-priced and can secure a high bandwidth, has been explored over the ATM technology. The ATM has drawbacks in that it is relatively high-priced, has a limited bandwidth, and must perform a segmentation process for each IP packet. Thus, the PON architecture favors to be operated in the Ethernet mode instead of the ATM technology.

The EPON standard issued by the IEEE 802.3ah is in progress under the name of "Ethernet in the First Mile (EFM)" and targeted for September 2003. Draft v1.2 is currently in progress, and Draft v2.0 is expected to be completed on November 2003. FIG. 2 illustrates the format of an OAM packet 200 proposed in the Draft v1.2.

In order to perform a loop-back test between a local device and a remote device, the local device transmits a loop-back control OAM PDU (Packet Data Unit) to the remote device. Note that the loop-back control OAM PDU includes a loop-back time determined by the local device. The remote device, having received the loop-back control OAM PDU, is changed into the loop-back state and transmits the loop-back state information of the remote device to the local device using an OAM PDU information, thereby initiating the loop-back process.

After the loop-back test is performed for a predetermined time, a termination of the loop-back test is performed. There are two methods to perform the termination process. In the first method, the local device tries to terminate a loop-back test. In a second method, the remote device tries to terminate a loop-back test. According to the first method, when the local device tries to terminate a loop-back test, the local device transmits a loop-back control OAM PDU to the remote device, during which the loop-back control OAM PDU includes a loop-back time determined as '0'. Then, the remote device receives the loop-back control OAM PDU including a loop-back time of '0', and sets the loop-back time to '0' in order to terminate the loop-back test. Subsequently, the remote device transmits an OAM PDU information containing a changed loop-back state to the local device. The local device receives the OAM PDU information transmitted from the remote device and then transmits its own changed loop-back state—a loop-back stop state—to the remote device, so that the loop-back process can be terminated.

The second method of the termination process involves the termination of a loop-back time, which is determined by the local device with the start of the loop-back process. That is, as the loop-back time determined by the local device is terminated in the remote device, the remote device transmits an OAM PDU information, in which a changed loop-back state is included, to the local device. Then, the local device, in response to this, transmits its own loop-back state—a loop-back stop state—to the remote device, so that the loop-back process is terminated.

As described above, in order to perform the start and the termination of a loop-back, a local device and a remote device exchange two kinds of messages—a loop-back control OAM PDU and an OAM PDU information. Accordingly, the prior art has disadvantages in that the complexity of the systems are increased due to the inefficient message exchange protocol.

SUMMARY OF THE INVENTION

The present invention has been made to overcome the above-mentioned problems and provides additional advantages, by providing a method of efficiently controlling a loop-back process so as to simplify the loop-back process and the construction of a loop-back system.

In one aspect, there is provided a method of controlling a loop-back process between a local device and a remote device in an Ethernet passive optical network. The method includes the steps of: (a) adding a predetermined field into a loop-back control OAM PDU in the loop-back process, the predetermined field distinguishing messages for initiation of a loop-back process and messages for termination of a loop-back process; and (b) the local device and the remote device performing a loop-back process using the loop-back control OAM PDU into which the predetermined field is added.

BRIEF DESCRIPTION OF THE DRAWINGS

The above features and advantages of the present invention will be more apparent from the following detailed description taken in conjunction with the accompanying drawings, in which:

FIG. 4 is a view illustrating types of a control field in a loop-back control OAM PDU according to the present invention.

DETAILED DESCRIPTION OF THE PREFERRED EMBODIMENT

Hereinafter, a method of controlling a loop-back process in an Ethernet passive optical network according to preferred embodiments of the present invention will be described with reference to the accompanying drawings. For the purposes of clarity and simplicity, a detailed description of known functions and configurations incorporated herein will be omitted as it may make the subject matter of the present invention unclear.

The present invention, which relates to OAM technology that is now being discussed in IEEE 802.3ah EFM, is applicable in networks including both the point-to-multipoint EPONs and the point-to-point network structures. In particular, a loop-back test between a local device and a remote device is realized using only a loop-back control OAM PDU, instead of using conventional OAM PDU information, according to the teachings of the present invention. That is, in the prior art, a local device transmits an initiation request message (Initiate_Req) for initiating a loop-back test to a remote device, and then the remote device transmits an acknowledge message (Initiate_Ack), in response to the loop-back test initiation message using an OAM PDU information, to the local device. However, in the present invention, a loop-back test process between a local device and a remote device is performed using only one kind of message, that is, a loop-back control OAM PDU. Therefore, it is possible to implement the process in a simple and efficient manner in the EPON system. To this end, in the present invention, a control field (Control_field) of 1 byte is newly defined in the loop-back control OAM PDU, as explained hereinafter.

Figure 1:
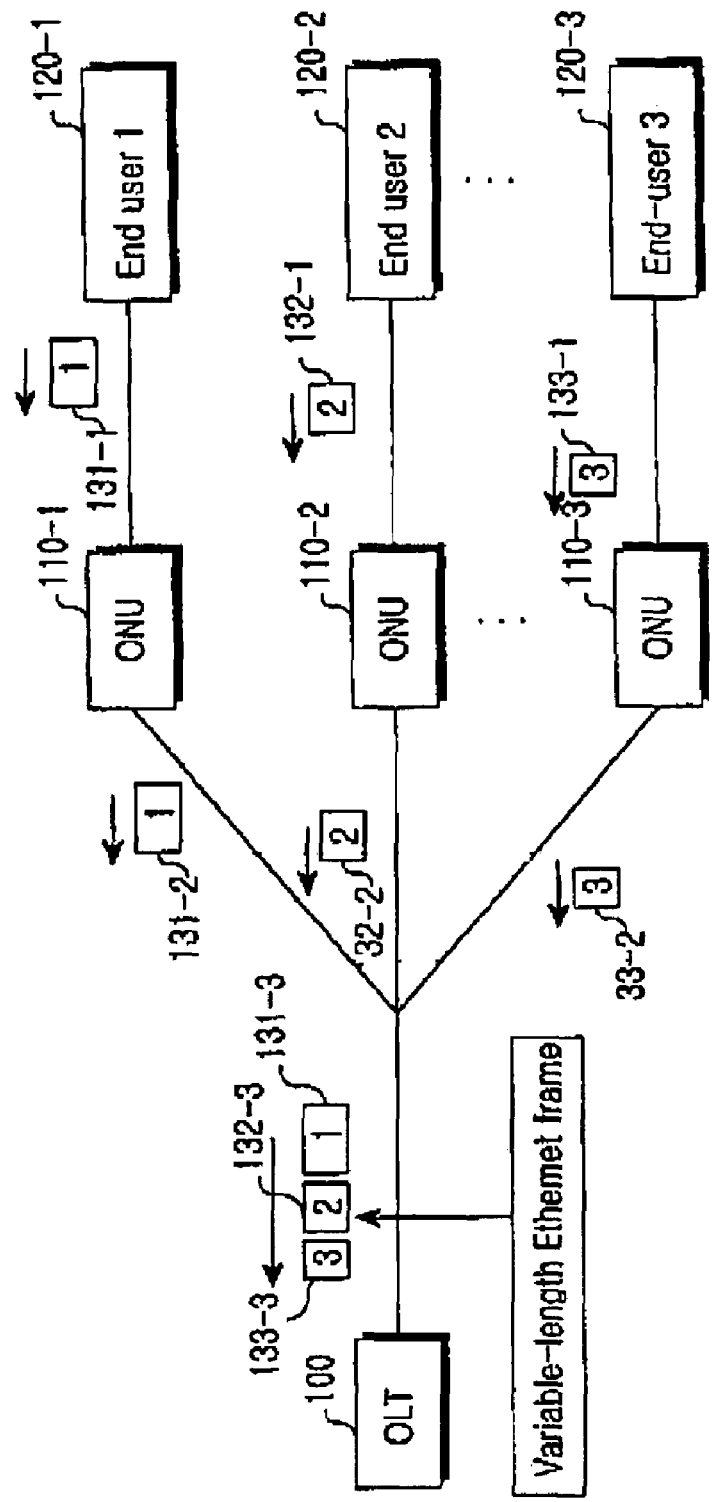
FIG. 1 is a view illustrating a physical network architecture of a general passive optical network.
Figure 2:
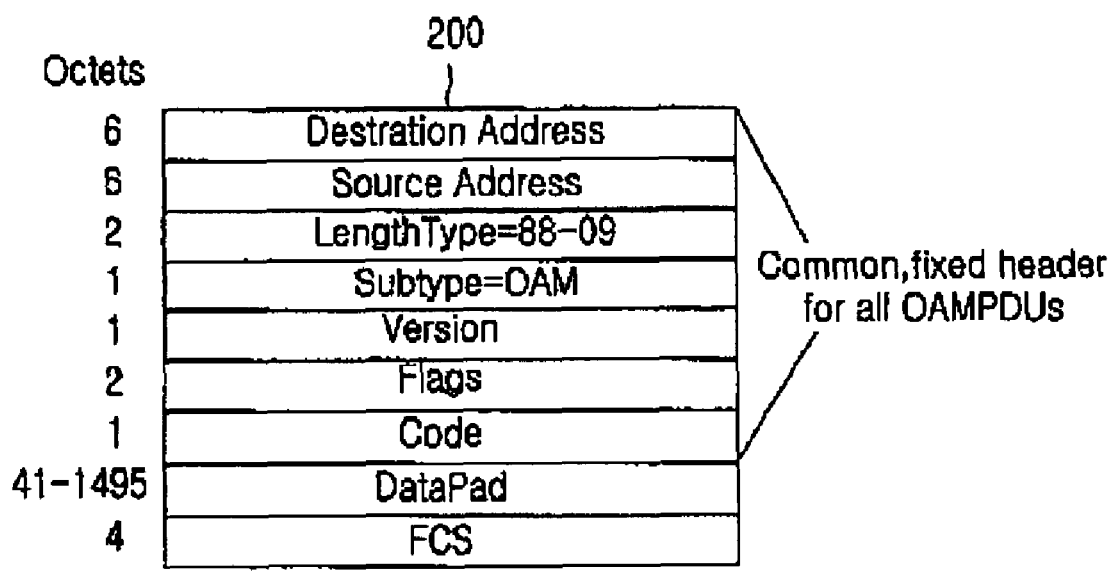
FIG. 2 is a view illustrating a format of an OAM packet proposed in Draft v1.2.
Figure 3:
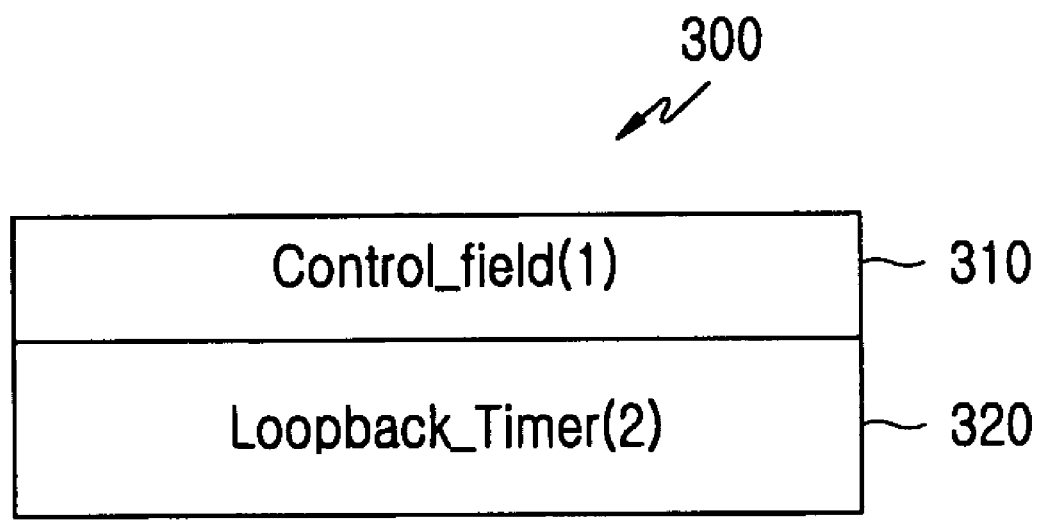
FIG. 3 is a view illustrating a format of a loop-back control OAM PDU according to the present invention.

FIG. 3 illustrates the format of a loop-back control OAM PDU according to the present invention. As shown in FIG. 3, a loop-back control OAM PDU 300 according to the present invention comprises a control field (Control_Field) 310 and a loop-back timer (Loop-back_Timer) field 320. The control field 310 is a field for distinguishing messages used during the loop-back initiation process and the loop-back termination process. That is, messages transmitted/received between the local device and the remote device are distinguished by the control field 310.

FIG. 4 illustrates the types of a control field in a loop-back control OAM PDU according to the present invention. As shown in FIG. 4, the control field in the loop-back control OAM PDU has one of five field values, which includes: a field value of 'Initiate_Req' representing a loop-back process initiation request message requested from a local device; a field value of 'Initiate_Ack' representing an initiation acknowledgment message outputted from a remote device so as to acknowledge the loop-back process initiation request message requested from a local device; a field value of 'Exit_req1' representing a loop-back process termination request message requested from a local device to a remote device; a field value of 'Exit_req2' representing a loop-back process termination request message requested from a remote device to a local device; and, a field value of 'Exit_Ack' representing a termination acknowledgment message transmitted from a local device to a remote device so as to acknowledge the field value of the 'Exit_req2'. As shown, '0x01', '0x02', '0x03', '0x04', and '0x05' may be respectively assigned for these fields. However, it should be noted that such field values are only examples for explaining the present invention, and the present invention is not to be limited by the values.

Figure 5:
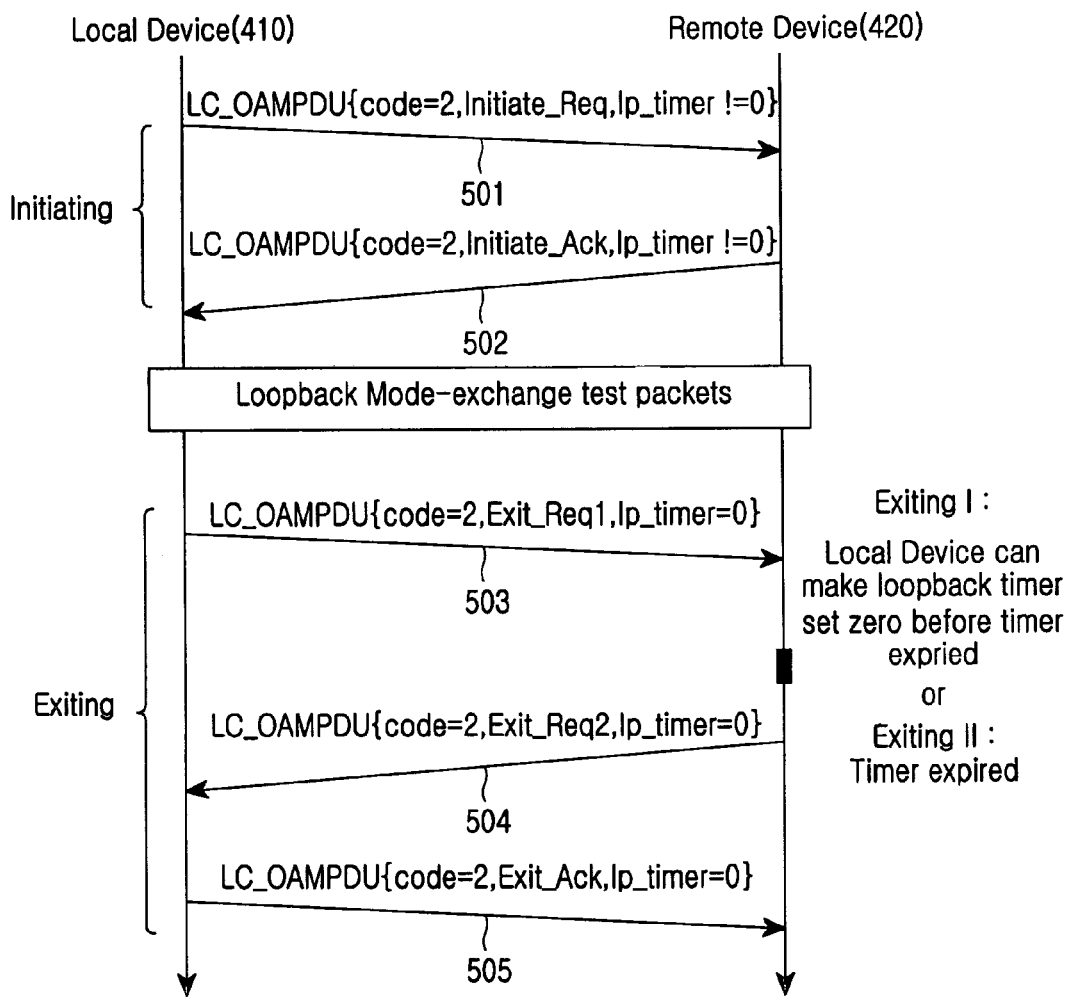
FIG. 5 is a view illustrating a process of exchanging different messages between a local device and a remote device according to the present invention.

FIG. 5 illustrates a process of exchanging different messages, wherein the messages distinguished by a value of a control field (Control_field) between a local device and a remote device according to the present invention. The process according to the present invention will be explained with reference to FIG. 3 to FIG. 5.

A loop-back initiation process is initiated while a local device 410 transmits a loop-back control OAM PDU to a remote device 420 (step 501). At this time, the control field (Control_field) in the PDU, as shown in FIG. 4, may be '0x01'. The value of a loop-back timer 320 in the PDU in FIG. 3 is not '0'. When a loop-back process is initiated between the local device 410 and the remote device 420, the local device 410 determines the value of a loop-back timer and transmits the determined value to the remote device 420. In response, the remote device 420 performs a loop-back process during the duration of the corresponding timer value. After receiving the loop-back control OAM PDU, and the remote device 420 transmits a loop-back control OAM PDU, which has the same frame structure as the received one, to the local device 410. At this time, the control field (Control_field) 310 transmitted from the remote device 420 to the local device 410, as shown in FIG. 4, may be '0x02'. Also, the loop-back process has not been terminated yet, so the value of the loop-back timer 320 in the PDU is not '0'. Accordingly, the loop-back initiation process is completed, and now the local device and the remote device is able to performs a loop-back operation to exchange test packets.

A loop-back termination process is classified into two method: a first method in which the local device 410 terminates the loop-back process and a second method in which the remote device 420 terminates the loop-back process.

In the first method, the local device 410 terminates the loop-back process, the local device 410 requests loop-back termination to the remote device 420 using a loop-back control OAM PDU (step 503). At this time, the control field 310 in the loop-back control OAM PDU, as shown in FIG. 4, may be '0x03'. Then, the loop-back timer field 320 in the loop-back control OAM PDU has a value of '0' (loop-back timer=0). That is, the value of the loop-back timer become '0' in order to terminates the loop-back process between the local device 410 and the remote device 420.

Subsequently, as an acknowledgment of receiving the loop-back control OAM PDU transmitted from the local device 410 so as to terminate the loop-back process, the remote device 420 sets its own loop-back time to '0', and changes a loop-back state into a termination state. At the same time, the remote device 420 transmits a loop-back control OAM PDU to the local device 410 (step 504). As shown in FIG. 4, the loop-back control OAM PDU transmitted from the remote device 420 at Step 504 has 'control field (Control_field)=0×04' and 'loop-back time=0'. Thereafter, in respond to the loop-back control OAM PDU having 'control field (Control_field)=0×05' and 'loop-back time=0', the local device 410 performs a loop-back termination process (step 505).

In the second method, the loop-back process is terminated after a predetermined time period has expired after the initiation of the loop-back process. In this case, the remote device 420, as shown in FIG. 4, transmits a loop-back control OAM PDU having 'control field (Control_field)=0×04' and 'loop-back time=0' to the local device 410. In response to the loop-back control OAM PDU having 'control field (Control_field)=0×05' and 'loop-back time=0', the local device 410 performs a loop-back termination process (step 505).

As described above, the present invention simplifies the initiation and the termination processes for a loop-back process, by avoiding the usage of OAM PDU information along with a loop-back control OAM PDU. To this end, a field is newly defined in a loop-back control OAM PDU, so that the initiation and the termination processes for a loop-back may be performed with the messages that can be distinguished by the value of the field, so as to have an effect of simplifying the complexity of the processes. Further, the loop-back processes are represented using message fields in an EPON, so that the loop-back process may be realized in simple and efficient manners.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of controlling a loop-back process between a local device and a remote device in an Ethernet passive optical network, the method comprising the steps of:
    (a) providing a predetermined field in a loop-back control OAM PDU (operation, administration, and maintenance—packet data unit), the predetermined field having distinguishing messages for an initiation of the loop-back process and a termination of the loop-back process; and
    (b) the local device and the remote device performing the loop-back process, which includes an initiation of the loop-back process and a termination of the loop-back process, using the loop-back control OAM PDU,
    wherein the loopback process performed by using the loop-back control OAM PDU into which the distinguishing messages of the predetermined field are added, further comprises:
    a loopback process initiation step of transmitting, by the local device, a loop-back control OAM PDU requesting the initiation of the loop-back process to the remote device; and
    a loopback process termination step of transmitting, by the local device, a loop-back control OAM PDU requesting the termination of the loopback process to the remote device, wherein the predetermined field includes one of:
    a first field value representing a message requesting an initiation of a loop-back process;
    a second field value representing a message acknowledging the initiation request message of the loop-back process;
    a third field value representing a message requesting a termination of the loop-back process from the local device to the remote device;
    a fourth field value representing a message requesting a termination of the loop-back process from the remote device to the local device; and
    a fifth field value representing a message acknowledging the fourth field value from the local device to the remote device.

2. A method of controlling a loop-back process between a local device and a remote device in an Ethernet passive optical network, the method comprising the steps of:
    (a) providing a predetermined field in a loop-back control OAM PDU (operation, administration, and maintenance—packet data unit), the predetermined field having distinguishing messages for an initiation of the loop-back process and a termination of the loop-back process; and
    (b) the local device and the remote device performing the loop-back process, which includes an initiation of the loop-back process and a termination of the loop-back process, using the loop-back control OAM PDU,
    wherein the loopback process performed by using the loop-back control OAM PDU into which the distinguishing messages of the predetermined field are added, further comprises:
    a loopback process initiation step of transmitting, by the local device, a loop-back control OAM PDU requesting the initiation of the loop-back process to the remote device; and
    a loopback process termination step of transmitting, byte local device, a loop-back control OAM PDU requesting the termination of the loopback process to the remote device,
    wherein die loop-back process termination step further includes:
    transmitting, by the local device, the loop-back control OAM PDU acknowledging the termination of the loop-back process to the remote device.

3. A method of controlling a loop-back process between a local device and a remote device in an Ethernet passive optical network, the method comprising the steps of:
    (a) providing a predetermined field in a loop-back control OAM PDU (operation, administration, and maintenance—packet data unit), the predetermined field having distinguishing messages for an initiation of the loop-back process and a termination of the loop-back process; and
    (b) the local device and the remote device performing the loop-back process, which includes an initiation of the loop-back process and a termination of the loop-back process, using the loop-back control OAM PDU,
    wherein the loopback process performed by using the loop-back control OAM PDU into which the distinguishing messages of the predetermined field are added, further comprises:
    a loopback process initiation step of transmitting, by the local device, a loop-back control OAM PDU requesting the initiation of the loop-back process to the remote device; and
    a loopback process termination step of transmitting, by the local device, a loop-back control OAM PDU requesting the termination of the loopback process to the remote device,
    wherein the loop-back process termination step includes the steps of:
    sensing, by the remote device, a termination of a predetermined time of the loop-back process;
    transmitting, by the remote device, a loop-back control OAM PDU requesting the termination of the loop-back process to the local device; and
    transmitting, by the local device, a loop-back control OAM PDU acknowledging the termination of the loop-back process to the remote device.

* * * * *